United States Patent
Hsiao et al.

(10) Patent No.: US 12,535,266 B2
(45) Date of Patent: Jan. 27, 2026

(54) REFRIGERATOR STORAGE TEMPERATURE CONTROL METHOD

(71) Applicant: TECO Electric & Machinery Co., Ltd., Taipei (TW)

(72) Inventors: Chih-Hung Hsiao, Taipei (TW); Hsien-Lai Yu, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 363 days.

(21) Appl. No.: 18/452,237

(22) Filed: Aug. 18, 2023

(65) Prior Publication Data

US 2024/0085100 A1 Mar. 14, 2024

(30) Foreign Application Priority Data

Sep. 14, 2022 (TW) .................................. 111134715

(51) Int. Cl.
*G05B 15/02* (2006.01)
*F25D 29/00* (2006.01)

(52) U.S. Cl.
CPC .............. *F25D 29/00* (2013.01); *G05B 15/02* (2013.01); *F25D 2600/04* (2013.01); *F25D 2700/12* (2013.01)

(58) Field of Classification Search
CPC ......... F25B 2600/0253; F25D 2600/04; F25D 2700/12; F25D 29/00; G05B 15/02
See application file for complete search history.

(56) References Cited

U.S. PATENT DOCUMENTS

| 5,263,335 A | * | 11/1993 | Isono | ........................ F24F 11/86 62/229 |
| 10,001,311 B2 | * | 6/2018 | Ohnishi | ................ F25B 49/025 |
| 2009/0007575 A1 | * | 1/2009 | Kaga | ........................ F25B 49/02 62/126 |

(Continued)

FOREIGN PATENT DOCUMENTS

| CN | 112484367 A | * | 3/2021 | .............. F25D 11/02 |
| CN | 114646172 A | * | 6/2022 | ........... F25D 29/005 |

*Primary Examiner* — Scott T Baderman
*Assistant Examiner* — Mario M Velez-Lopez
(74) *Attorney, Agent, or Firm* — MUNCY, GEISSLER, OLDS & LOWE, P.C.

(57) ABSTRACT

In a refrigerator storage temperature control method, according to a target temperature (Ts), a regulated temperature upper limit value (T1) and an allowable temperature upper limit value (T2) are defined. According to T1 and T2, an adjustment interval, an allowable temperature interval and a convergent cooling interval are defined. A detection temperature is periodically detected and updated with a detection period, the detection temperature in the previous detection period is a previous temperature, and the detection temperature in the instant detection period is a current temperature. A control module performs RPS-m for a compressor when the current temperature falls within the adjustment interval, RPS+0 when the current temperature falls within the allowable temperature interval, and RPS+o when the current and previous temperatures fall within the convergent cooling interval and the allowable temperature interval, respectively. Detection, judgment and control are repeated until the current temperature falls within the allowable temperature interval.

8 Claims, 7 Drawing Sheets

(56) References Cited

U.S. PATENT DOCUMENTS

| | | | |
|---|---|---|---|
| 2017/0336085 A1* | 11/2017 | Yasuo | F24F 5/0017 |
| 2019/0331356 A1* | 10/2019 | Seiler | F24F 11/38 |
| 2020/0126834 A1* | 4/2020 | Yamaguchi | H01L 21/67109 |
| 2022/0009309 A1* | 1/2022 | Miura | F25B 5/02 |
| 2022/0120486 A1* | 4/2022 | Kim | F04D 27/0238 |
| 2022/0397337 A1* | 12/2022 | Cha | F25D 17/08 |

* cited by examiner

REFRIGERATOR STORAGE TEMPERATURE CONTROL METHOD

BACKGROUND OF THE INVENTION (1) Field of the Invention

The invention relates to a temperature control method, and more particularly to a refrigerator storage temperature control method.

(2) Description of the Prior Art

Generally speaking, commercial refrigerators on the market are usually refrigerators with fixed operating frequencies, and having individual refrigeration devices (consisted of compressors and fans). The refrigeration device is usually temperature controlled. Most of models of the refrigerators mainly allow users to set a temperature setting and a hysteresis temperature. If a temperature is detected to be higher than the hysteresis temperature, then the refrigeration device would be started to cool down the temperature till the set temperature is achieved.

In addition, although the existing inverter refrigerator may utilize temperature and humidity sensors to detect related factors for control, yet these applications are usually few due to the cost consideration.

SUMMARY OF THE INVENTION

In view of the prior art, most models of the refrigerators allow users to set a temperature setting and a hysteresis temperature, and, if a temperature is detected to be higher than the hysteresis temperature, the refrigeration device would be started to lower the temperature till the set temperature is achieved. However, frequent startup and operation of the compressor would consume more power, and, if the hysteresis temperature is set too high in order to avoid frequent operations of the compressor, it is easy to cause the internal temperature of the refrigerator to fluctuate too much, which will cause the food inside perishable. Accordingly, it is an object of the present invention to provide a refrigerator storage temperature control method that can control the rotational speed of the fan to effectively maintain the temperature inside the storage space within an allowable temperature range with respect to the temperature setting.

In this present invention, a refrigerator storage temperature control method is applied to a refrigerator. The refrigerator includes a main refrigerator body, a compressor, a temperature sensor, a processing module and a control module. The main refrigerator body has a setting interface, a refrigeration space and a storage space connected spatially with the refrigeration space. The temperature sensor is configured for detecting a temperature of the storage space, the compressor disposed in the refrigeration space is configured for introducing a refrigerant gas in the refrigeration space to the storage space, and the control module is configured for controlling a revolution per second (RPS) of the compressor according to the temperature detected by the temperature sensor. The refrigerator storage temperature control method includes Step (A) to Step (F) as follows.

Step (A) is to utilize the setting interface to receive a target temperature (Ts) from a user. Step (B) is to utilize the processing module to define a regulated temperature upper limit value (T1=Ts−a° C., a>0) and an allowable temperature upper limit value (T2=Ts+a° C.), according to the Ts. Step (C) is to utilize the processing module to define an adjustment interval, an allowable temperature interval and a convergent cooling interval, according to the T1 and the T2. The adjustment interval is less than or equal to the T1, the allowable temperature interval is greater than the T1 and less than or equal to the T2, and the convergent cooling interval is greater than the T2.

In Step (D), the temperature sensor is utilized to detect and update periodically a detection temperature with a detection period, the detection temperature detected in a previous detection period is defined as a previous temperature, the detection temperature detected in an instant detection period is defined as a current temperature, and the temperature sensor further transmits the previous temperature and the current temperature to the processing module.

In Step (E), the processing module is utilized to generate a judgment result by determining within which period the current temperature falls, and further to transmit the judgment result to the control module. When the judgment result tells that the current temperature falls within the adjustment interval, the control module performs RPS-m, in which the m being a positive integer greater than 0 and less than 20. Then, when the detection temperature detected and updated by the temperature sensor with the detection period still falls within the adjustment interval, the control module performs RPS-n till that the detection temperature falls out of the adjustment interval, in which the n is a positive integer greater than 0 and less than 20. When the judgment result tells that the current temperature falls within the allowable temperature interval, the control module performs RPS+0. When the judgment result tells that the current temperature falls within the convergent cooling interval, and the previous temperature falls within the allowable temperature interval, the control module performs RPS+o, in which the o is a positive integer greater than 0 and less than 20. Then, when the detection temperature detected and updated by the temperature sensor with the detection period still falls within the convergent cooling interval, the control module performs RPS+p till that the detection temperature falls out of the convergent cooling interval, in which the p is a positive integer greater than 0 and less than 20.

In Step (F), when the judgment result of the Step (E) tells that the current temperature falls out of the allowable temperature interval, the Steps (D) to (E) are repeated, till that the judgment result of the Step (E) determines that the current temperature falls within the allowable temperature interval.

In one embodiment of the present invention, the Step (B) further includes a step of utilizing the processing module to define a shutdown temperature upper limit value (T3=Ts−b° C., b>a) according to the Ts, the Step (C) further includes a step of utilizing the processing module to define a shutdown interval according to the T3, the shutdown interval is less than or equal to the T3, the adjustment interval is greater than the T3, and the Step (E) further includes a step of having the control module to perform RPS=0 when the judgment result tells that the current temperature falls within the shutdown interval. Preferably, b=2a.

In one embodiment of the present invention, the Step (B) further includes a step of utilizing the processing module to define a convergent cooling temperature upper limit value (T4=Ts+c° C., c>b) according to the Ts, the Step (C) further includes a step of utilizing the processing module to define a normal cooling interval according to the T4, the normal cooling interval is greater than the T4, the convergent cooling interval is further less than or equal to the T4, the Step (E) further includes a step of having the control module to perform RPS+o upon when the judgment result tells that the current temperature falls within the convergent cooling interval, and the previous temperature falls within the allowable temperature interval, and to perform RPS+p till that the detection temperature falls out of the convergent cooling interval upon when the detection temperature detected and updated by the temperature sensor with the detection period still falls within the convergent cooling interval, the Step (E) further includes a step of having the control module to perform RPS+0 upon when the judgment result tells that the current temperature falls within the convergent cooling interval, and the previous temperature falls within the normal temperature interval, and to perform RPS+p till that the detection temperature falls out of the convergent cooling interval upon when the detection temperature detected and updated by the temperature sensor with the detection period still falls within the convergent cooling interval, and the Step (E) further includes a step of having the control module to perform RPS+o upon when the judgment result tells that the current temperature falls within the normal cooling interval, and the previous temperature falls within the convergent cooling interval, and to perform RPS+o till that the detection temperature falls out of the normal cooling interval upon when the detection temperature detected and updated by the temperature sensor with the detection period still falls within the normal cooling interval. Preferably, c=4a.

Preferably, the Step (B) further includes a step of utilizing the processing module to define a normal cooling temperature upper limit value (T5=Ts+d° C., d>c) according to the Ts, the Step (C) further includes a step of utilizing the processing module to define a rapid cooling interval according to the T5, the rapid cooling interval is greater than the T5, the normal cooling interval is further less than or equal to the T5, the Step (E) further includes a step of having the control module to perform RPS+0 upon when the judgment result tells that the current temperature falls within the rapid cooling interval, and a temperature decrease detected by the temperature sensor with the detection period is greater than or equal to 3° C., and to perform RPS+n till that the detection temperature falls out of the rapid cooling interval upon when the temperature decrease is less than 3° C., and the Step (E) further includes a step of having the control module to perform RPS+0 upon when the judgment result tells that the current temperature falls within the normal cooling interval, and the previous temperature falls within the rapid cooling interval, and to perform RPS+o till that the detection temperature falls out of the normal cooling interval upon when the detection temperature detected and updated by the temperature sensor with the detection period still falls within the normal cooling interval. Preferably, d=10a.

In one embodiment of the present invention, m>n, n>o and o>p.

As stated, in this present invention, a plurality of temperature intervals are defined according to the target temperature. According to the temperature interval that the detection temperature falls, the revolutions per second of the compressor can be adjusted to maintain the temperature in the refrigerator within the allowable temperature interval of the target temperature.

All these objects are achieved by the refrigerator storage temperature control method described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a refrigerator storage temperature control method. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
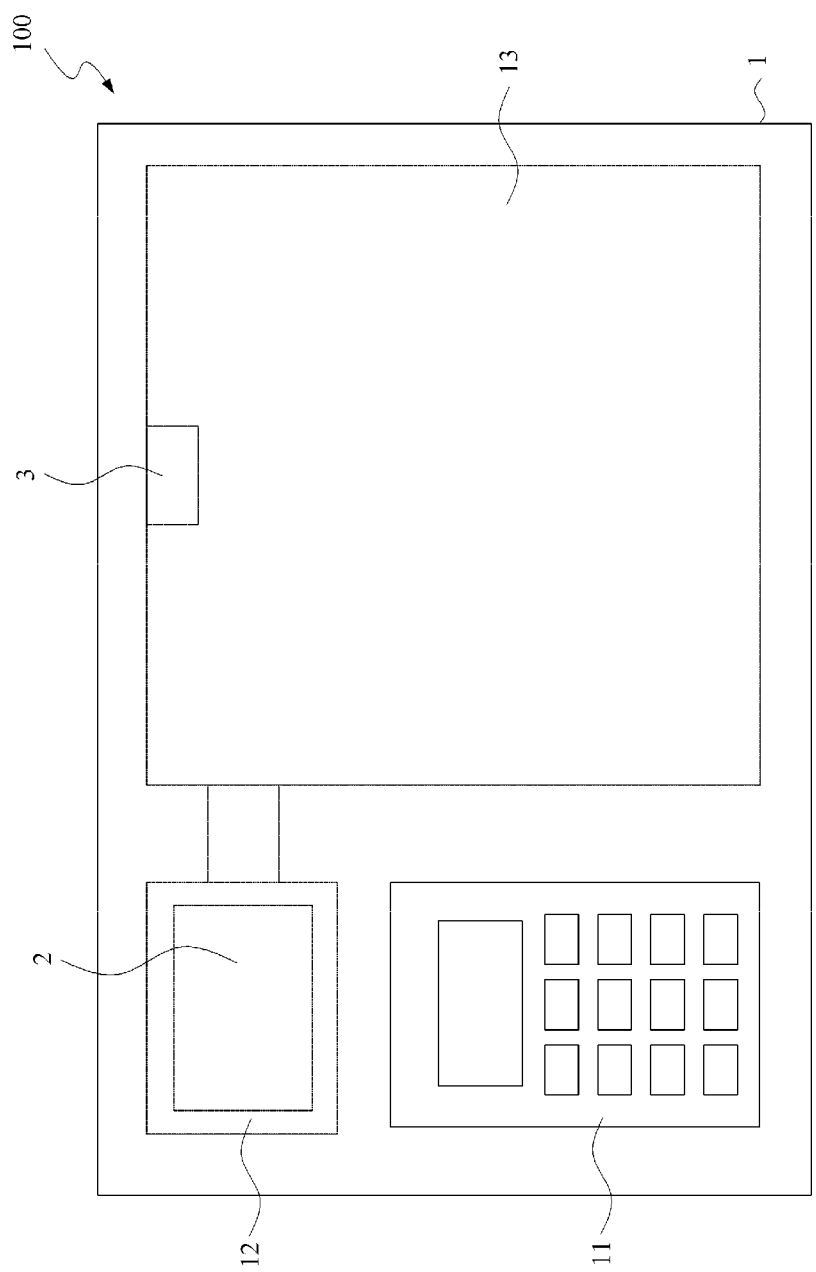
FIG. 1 is a schematic view of a refrigerator applying a refrigerator storage temperature control method in accordance with the present invention.
Figure 2:
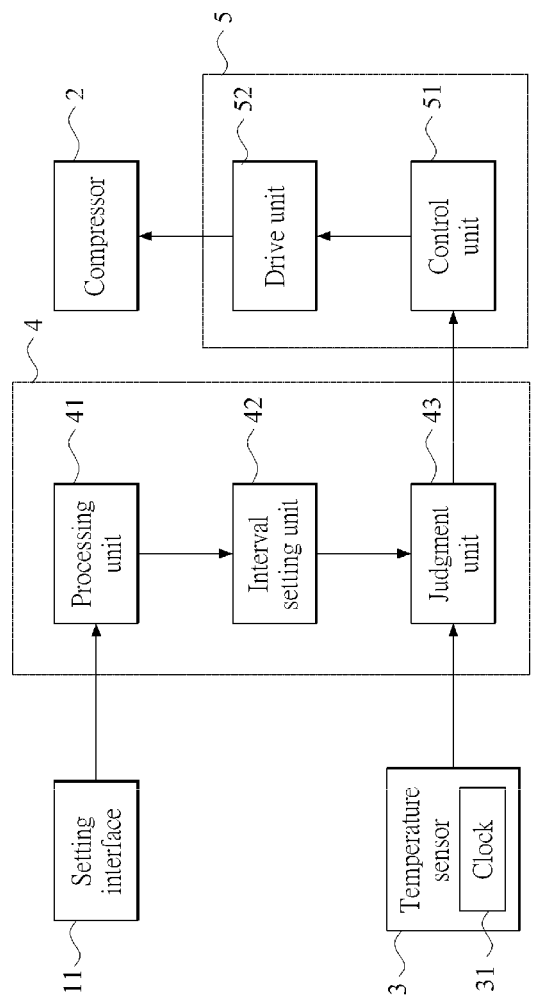
FIG. 2 is a schematic block view of the refrigerator of FIG. 1.
Figure 3A:
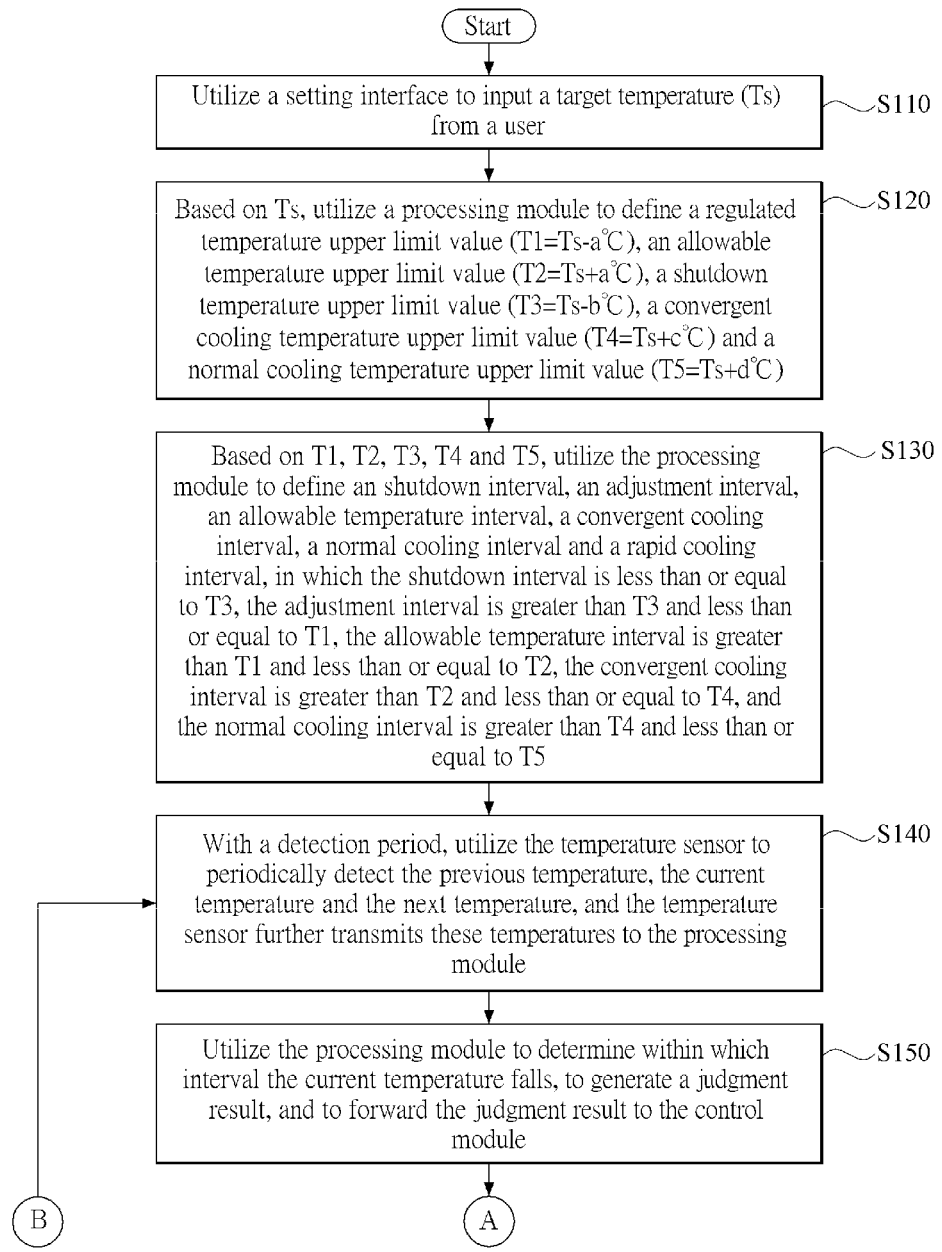
FIG. 3A to FIG. 3E are together to show schematically a flowchart of a preferred refrigerator storage temperature control method in accordance with the present invention.
Figure 3B:
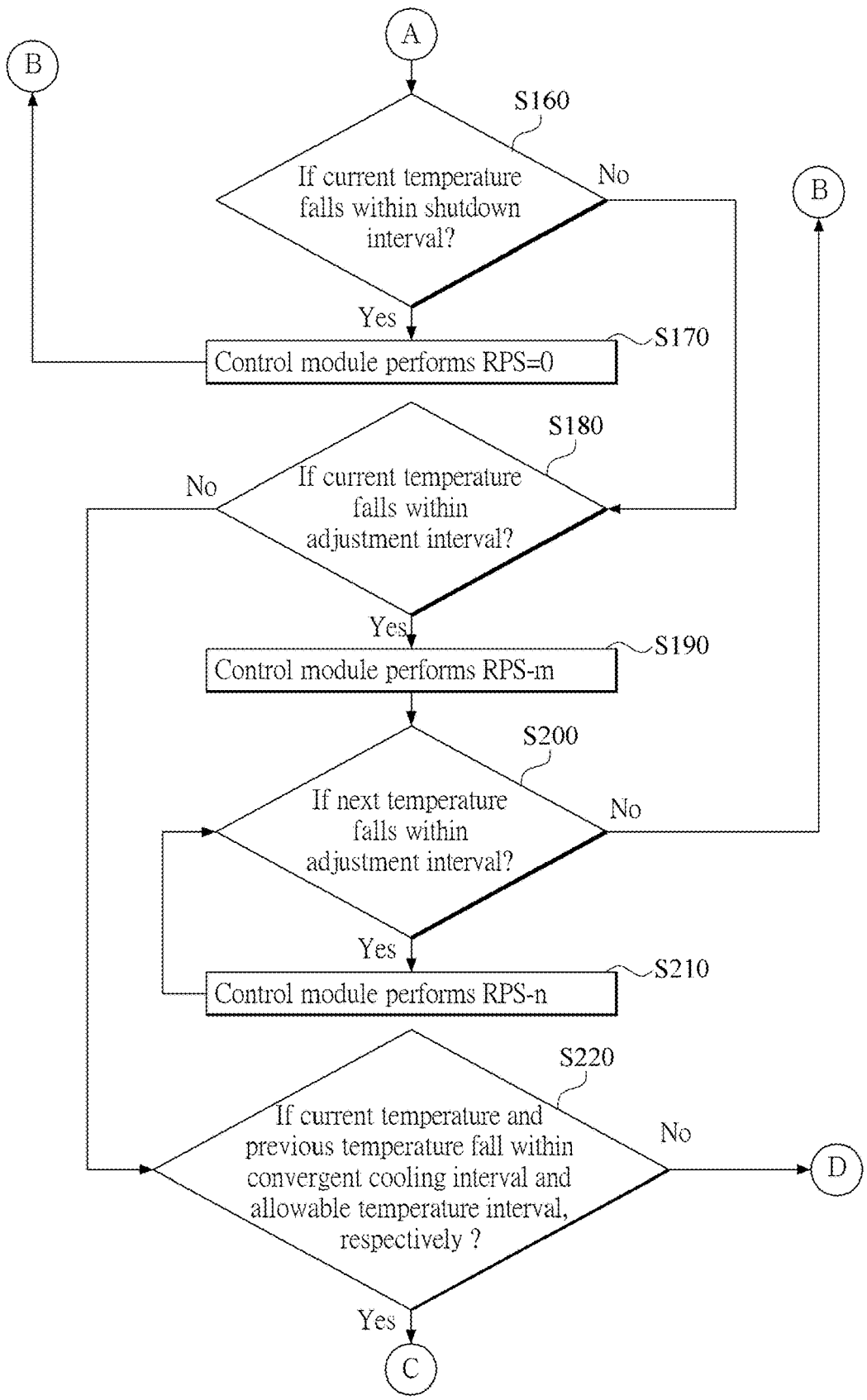
Figure 3C:
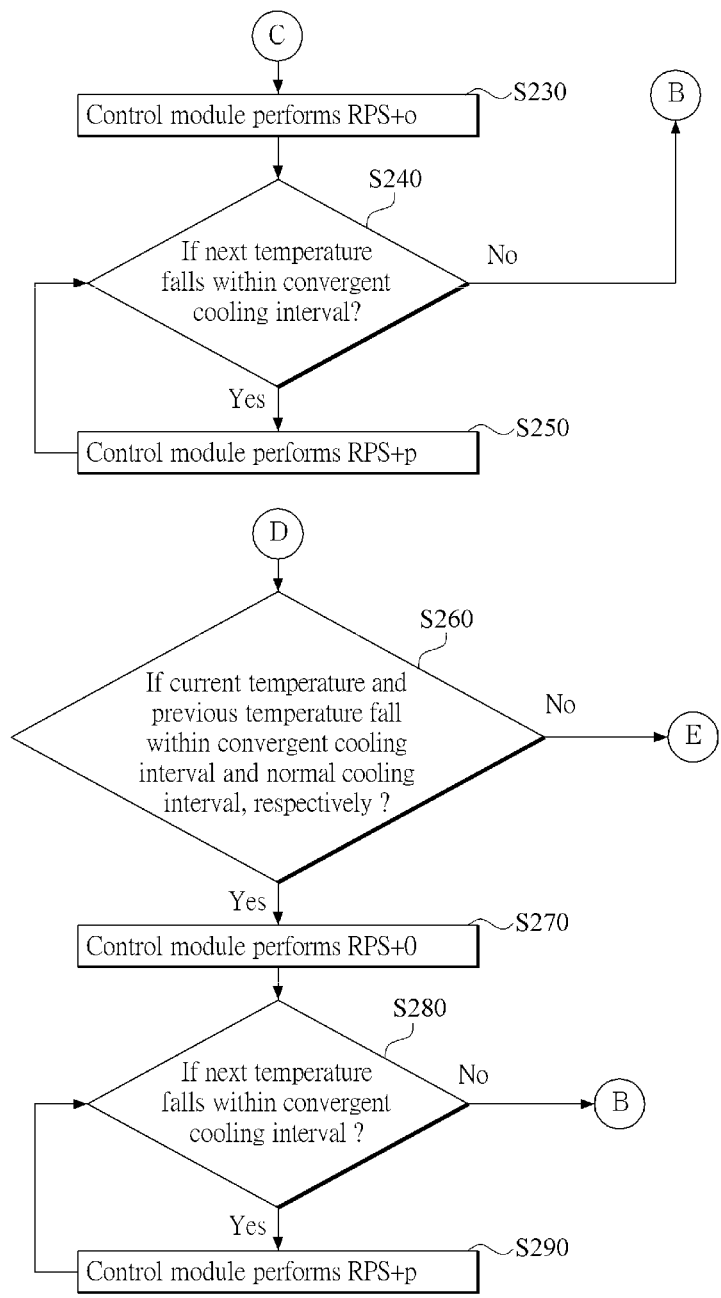
Figure 3D:
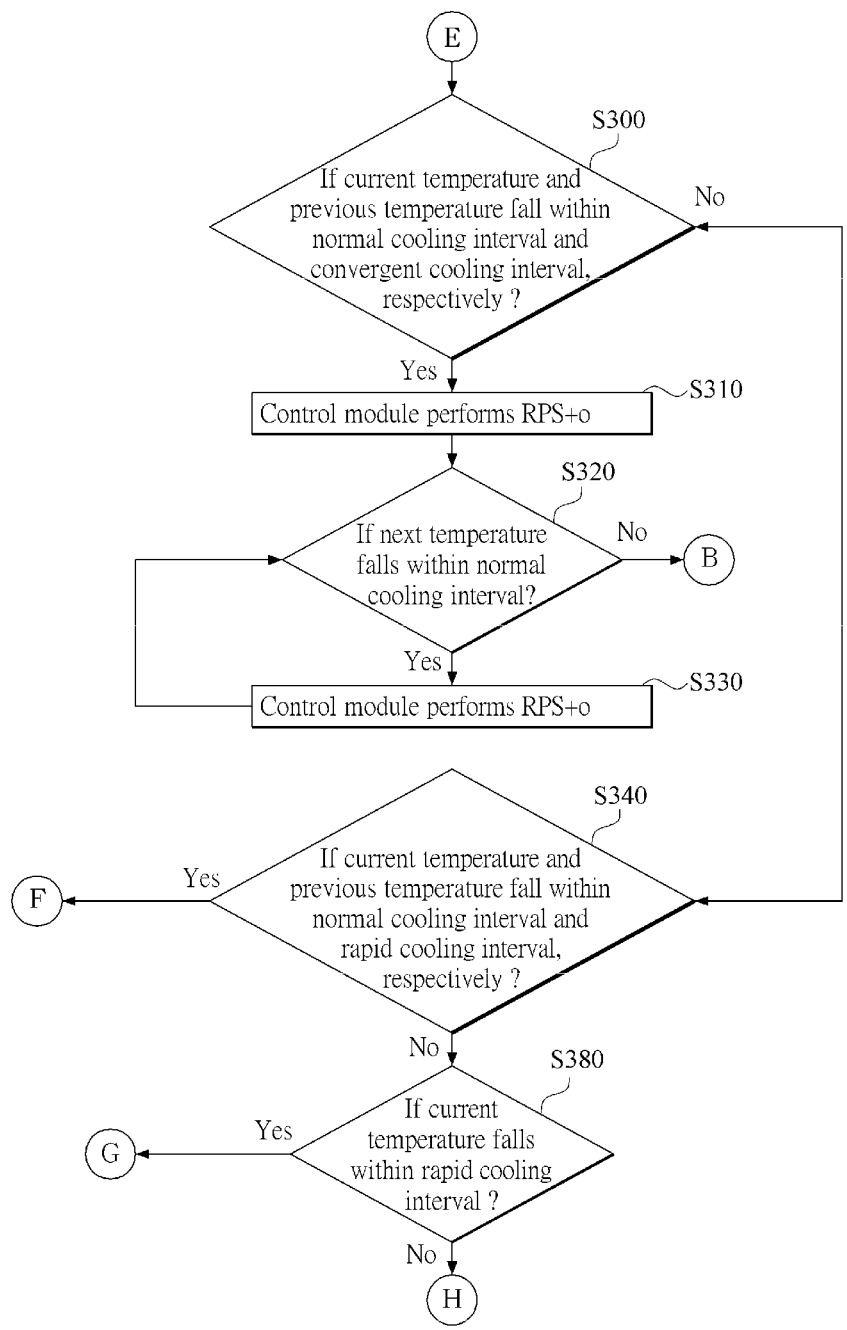
Figure 3E:
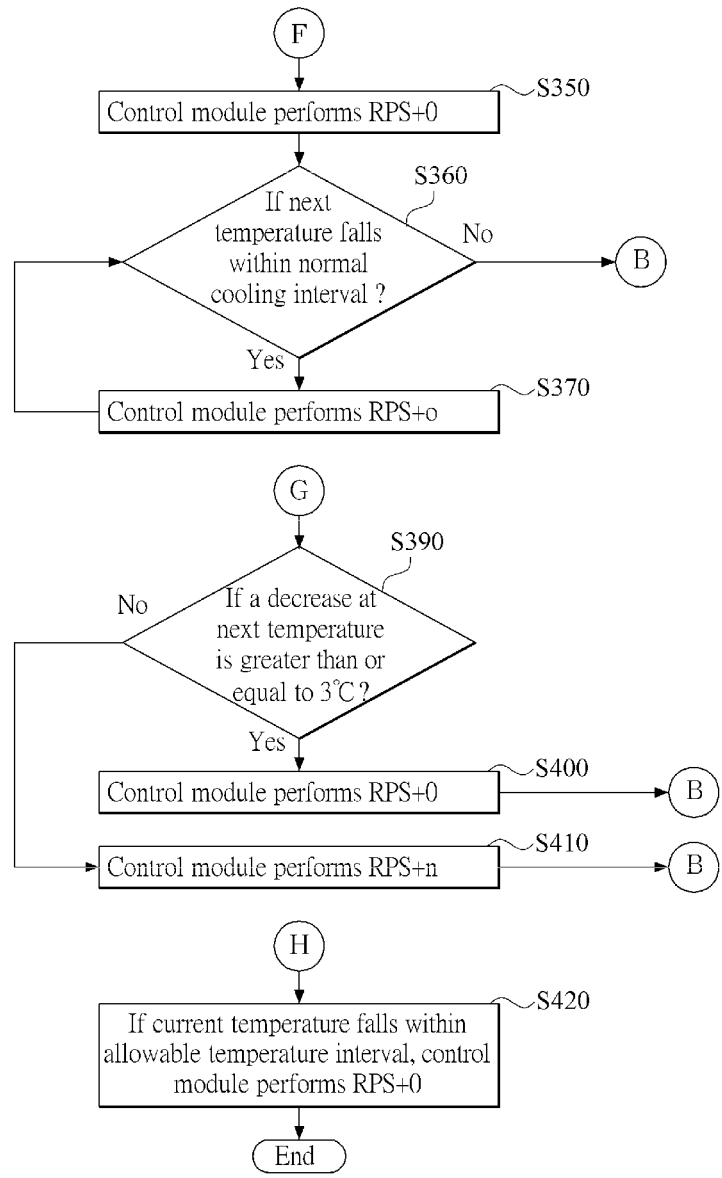

Refer now to FIG. 1 and FIG. 2; where FIG. 1 is a schematic view of a refrigerator applying a refrigerator storage temperature control method in accordance with the present invention, and FIG. 2 is a schematic block view of the refrigerator of FIG. 1.

As shown in FIG. 1 and FIG. 2, a refrigerator 100 includes a main refrigerator body 1, a compressor 2, a temperature sensor 3, a processing module 4 and a control module 5.

The main refrigerator body 1 has a setting interface 11, a refrigeration space 12 and a storage space 13. The setting interface 11 is configured for a user to set a target temperature (Ts thereafter). The refrigeration space 12 is used to supply a refrigerant gas. The storage space 13, connected spatially with the refrigeration space 12, is configured to receive the refrigerant gas so as to keep objects stored in the storage space 13 with a low-temperature surrounding.

The compressor 2, disposed in the refrigeration space 12, is configured to have a temperature of the refrigerant gas lower than Ts, but not limited thereto. The compressor 2 can be operated according to preset operational parameters. However, the temperature of the refrigerant gas shall be kept lower than Ts. For example, if the allowable setting range of Ts is set to a range of −20° C.~20° C., then the temperature of the refrigerant gas provided by the compressor 2 shall be lower the −20° C.

The temperature sensor 3, disposed in the storage space 13, is configured to detect a temperature of the storage space 13, and furnished thereinside with a clock 31 for the temperature sensor 3 to detect and update a detection temperature periodically by a detection period. The detection temperature detected at a previous detection period is defined as a previous temperature, the detection temperature detected at this instant detection period is defined as a current temperature, and the next detection temperature detected at the next detection period is defined as a next temperature. The temperature sensor 3 would further transmit the previous temperature, the current temperature and the next temperature.

The processing module 4 includes a processing unit 41, an interval setting unit 42 and a judgment unit 43. The processing unit 41, connected electrically with the setting interface 11, can define a regulated temperature upper limit value (T1 thereafter), an allowable temperature upper limit value (T2 thereafter), a shutdown temperature upper limit value (T3 thereafter), a convergent cooling temperature upper limit value (T4 thereafter) and a normal cooling temperature upper limit value (T5 thereafter) according to Ts; in which T1=Ts−a° C., a>0, T2=Ts+a° C., T3=Ts−b° C., b>a, T4=Ts+c° C., c>b, T5=Ts+d° C., and d>c.

In this embodiment, Ts=−10° C., a=0.5, b=1, c=2, and d=5. As such, T1=−10.5° C., T2=−9.5° C., T3=−11° C., T4=−8° C., and T5=−5° C.

The interval setting unit 42, connected electrically with the processing unit 41, is configured to define a shutdown interval, an adjustment interval, an allowable temperature interval, a convergent cooling interval, a normal cooling interval and a rapid cooling interval, according to T1, T2, T3, T4 and T5. The shutdown interval is less than or equal to T3, the adjustment interval is greater than T3 and less than or equal to T1, the allowable temperature interval is greater than T1 and less than or equal to T2, the convergent cooling interval is greater than T2 and less than or equal to T4, and the normal cooling interval is greater than T4 and less than or equal to T5. In other words, Shutdown interval≤T3, T3<Adjustment interval≤T1, T1<Allowable temperature interval≤T2, T2<Convergent cooling interval T4, T4<Normal cooling interval≤T5, and T5<Rapid cooling interval. In addition, the ranges defined by the interval setting unit 42 are all temperature ranges.

The judgment unit 43, connected electrically with the temperature sensor 3 and the interval setting unit 42, is configured for determining within which aforesaid range Ts would fall to generate a judgment result.

The control module 5 includes a control unit 51 and a drive unit 52. The control unit 51, connected electrically with the judgment unit 43, is configured to generate a rotational-speed control instruction according to a judgment result. The drive unit 52, connected electrically with the control unit 51, is configured to control a revolutions per second (RPS) of the compressor 2 according to a rotational-speed control instruction.

As described above, when the judgment result tells that the current temperature falls within the shutdown interval, the control module 5 would perform RPS=0 (i.e., the control unit 51 would generate a rotational-speed control instruction of RPS=0 for the drive unit 52 to control accordingly RPS=0 at the compressor 2). In this embodiment, the expression RPS=0 implies that the compressor 2 is in a shutdown state.

When the judgment result tells that the current temperature falls within the adjustment interval, the control module 5 would perform RPS-m. Then, when the temperature sensor 3 tells that the detected and updated detection temperature has in the detection period is still within the adjustment interval, then the control module 5 would perform RPS-n, till a detection temperature out of the adjustment interval is detected.

When the judgment result tells that the current temperature falls within the allowable temperature interval, then the control module 5 would perform RPS+0.

When the judgment result tells that the current temperature falls within the convergent cooling interval, and the previous temperature falls within the allowable temperature interval, then the control module 5 would perform RPS+o. Thereafter, when the temperature sensor tells that the detected and updated detection temperature in the detection period is still within the convergent cooling interval, then the control module 5 would perform RPS+p, till a detection temperature out of the convergent cooling interval is detected. When the judgment result tells that the current temperature falls within the convergent cooling interval, and the previous temperature falls within the normal cooling interval, then the control module 5 would perform RPS+0. Thereafter, when the temperature sensor tells that the detected and updated detection temperature in the detection period is still within the convergent cooling interval, then the control module 5 would perform RPS+p, till a detection temperature out of the convergent cooling interval is detected.

Each of the aforesaid m, n, o and p is a positive integer greater than 0 and less than 20; preferably, m>n>o>p. In this embodiment, m can be 5, n can be 3, o can be 2, and p can be 1; but not limited thereto. It shall be understood that these integers can be varied in accordance with practical requirements.

When the judgment result tells that the current temperature falls within the normal cooling interval, and the previous temperature falls within the convergent cooling temperature interval, then the control module 5 would perform RPS+o. Thereafter, when the temperature sensor tells that the detected and updated detection temperature in the detection period is still within the normal cooling interval, then the control module 5 would perform RPS+o, till a detection temperature out of the normal cooling interval is detected. When the judgment result tells that the current temperature falls within the normal cooling interval, and the previous temperature falls within the rapid cooling interval, then the control module 5 would perform RPS+0. Thereafter, when the temperature sensor tells that the detected and updated detection temperature in the detection period is still within the normal cooling interval, then the control module 5 would perform RPS+o, till a detection temperature out of the normal cooling interval is detected.

When the judgment result determines that the current temperature falls within the rapid cooling interval, and the temperature sensor tells that a temperature declination degree in the detection period is greater than or equal to 3° C., the control module 5 would perform RPS+0. Otherwise, if the temperature declination degree is less than 3° C., then the control module 5 would perform RPS+n, till a detection temperature out of the rapid cooling interval is detected.

Please refer continuously to FIG. 3A through FIG. 3E together, where a flowchart of a preferred refrigerator storage temperature control method in accordance with the present invention is schematically shown. In this embodiment, the refrigerator storage temperature control method is applied to the aforesaid refrigerator 100, and includes Step S110 to Step S420 as follows.

Step S110 is to utilize the setting interface 11 to receive a target temperature (Ts) from a user. Step S120 is to utilize the processing module 4 to define the regulated temperature upper limit value (T1=Ts−a ° C.), the allowable temperature upper limit value (T2=Ts+a ° C.), the shutdown temperature upper limit value (T3=Ts−b° C.), the convergent cooling temperature upper limit value (T4=Ts+c ° C.) and the normal cooling temperature upper limit value (T5=Ts+d° C.), according to Ts.

Step S130 is to utilize the processing module 4 to define the shutdown interval, the adjustment interval, the allowable temperature interval, the convergent cooling interval, the normal cooling interval and the rapid cooling interval, according to T1, T2, T3, T4 and T5. The shutdown interval is less than or equal to T3, the adjustment interval is greater than T3 and less than or equal to T1, the allowable temperature interval is greater than T1 and less than or equal to T2, the convergent cooling interval is greater than T2 and less than or equal to T4, and the normal cooling interval is greater than T4 and less than or equal to T5.

Step S140 is to utilize the temperature sensor 3 to detect periodically the previous temperature, the current temperature and the next temperature with the detection period. The temperature sensor 3 further forwards the previous temperature, the current temperature and the next temperature to the processing module 4. In this embodiment, the temperature sensor 3 is to periodically detect and update the detection temperature with the detection periods, the detection temperature detected in the previous detection period is defined as the previous temperature, the detection temperature detected in this instant detection period is defined as the current temperature, and the detection temperature detected in the next detection period is defined as the next temperature, such that the previous temperature, the current temperature and the next temperature can be provided.

In detail, if the detection temperature detected in the first detection period is the current temperature, then the detection temperature detected in the following second detection period would be the next temperature. However, when the temperature sensor 3 detects the detection temperature in the second detection period, the detection temperature instantly detected in the second detection period would be the current temperature, the previous current temperature detected in the first detection period would be shifted now to be the new previous temperature, and the detection temperature to be detected in the third detection period will be defined as the next temperature.

Step S150 is to utilize the processing module 4 to generate the judgment result by determining within which period the current temperature falls, and further to transmit the judgment result to the control module 5.

Step S160 is to determine whether or not the current temperature falls within the shutdown interval? In this embodiment, Step S160 is performed by the judgment unit 43. If the current temperature falls within the shutdown interval, go to Step S170 for the control module 5 to perform RPS=0, and then go back to the aforesaid Step S140. Otherwise, if the current temperature does not fall within the shutdown interval, go to Step S180 for determining whether or not the current temperature falls within the adjustment interval?

As described above, when the current temperature falls within the adjustment interval, then go to Step S190 for the control module 5 to execute RPS-m, and then go to Step S200 for determining whether or not the next temperature falls within the adjustment interval? When the current temperature falls within the adjustment interval, Step S210 is performed to have the control module 5 to execute RPS-n, and then go back to Step S200 to determine continuously whether or not the next temperature falls within the adjustment interval? At this time, the next temperature would be the detection temperature detected in the following detection period. After the control module 5 performs RPS-m in Step S190, then in Step S200, temperature detecting and updating would be kept periodically with the detection period, till a new next temperature does not fall within the adjustment interval. Till then, the method would go back to perform Step S140.

When the current temperature is determined to fall out of the adjustment interval in Step S180, then go to Step S220 to determine whether or not the current temperature and the previous temperature falls within the convergent cooling interval and the allowable temperature interval, respectively. If the current temperature falls within the convergent cooling interval, and the previous temperature falls within the allowable temperature interval, then go to Step S230 to have the control module 5 to perform RPS+o, and further go to Step S240 to determine whether or not the next temperature falls within the convergent cooling interval?

If Step S240 determines that the next temperature falls within the convergent cooling interval, then go to Step S250 to have the control module 5 to perform RPS+p, and further go back to Step S240. The detection temperature detected by the temperature sensor 3 at the next detection period is the new next temperature, and, as such, the new next temperature is further to be judged if or not it falls within the convergent cooling interval? Until when the new next temperature falls out of the convergent cooling interval, then the method would go back to Step S140.

In Step S220, if it is determined that the current temperature falls out of the convergent cooling interval, or that the previous temperature falls out of the allowable temperature interval, then go to Step S260 to determine whether or not the current temperature and the previous temperature fall within the convergent cooling interval and the normal cooling interval, respectively. If the current temperature falls within the convergent cooling interval, and the previous temperature falls within the normal cooling interval, then go to Step S270 to have the control module 5 to perform RPS+0. Then, go to Step S280 to determine whether or not the next temperature falls within the convergent cooling interval.

As described, if it is determined in Step S280 that the next temperature falls within the convergent cooling interval, then go to Step S290 to have the control module 5 to perform RPS+p, and further go back to Step S280. The detection temperature detected by the temperature sensor 3 at the next detection period is the new next temperature, and, as such, the new next temperature is further to be judged if or not it falls within the convergent cooling interval? Until when the new next temperature falls out of the convergent cooling interval, then the method would go back to Step S140.

In Step S260, if it is determined that the current temperature falls out of the convergent cooling interval, or that the previous temperature falls out of the normal cooling interval, then go to Step S300 to determine whether or not the current temperature and the previous temperature fall within the normal cooling interval and the convergent cooling interval, respectively. If the current temperature falls within the normal cooling interval, and the previous temperature falls within the convergent cooling interval, then go to Step S310 to have the control module 5 to perform RPS+o. Then, go to Step S320 to determine whether or not the next temperature falls within the normal cooling interval.

As described, if it is determined in Step S320 that the next temperature falls within the normal cooling interval, then go to Step S330 to have the control module 5 to perform RPS+o, and further go back to Step S320. The detection temperature detected by the temperature sensor 3 at the next detection period is the new next temperature, and, as such, the new next temperature is further to be judged if or not it falls within the normal cooling interval? Until when the new next temperature falls out of the normal cooling interval, then the method would go back to Step S140.

In Step S300, if it is determined that the current temperature falls out of the normal cooling interval, or that the previous temperature falls out of the convergent cooling interval, then go to Step S340 to determine whether or not the current temperature and the previous temperature fall within the normal cooling interval and the rapid cooling interval, respectively. If the current temperature falls within the normal cooling interval, and the previous temperature falls within the rapid cooling interval, then go to Step S350 to have the control module 5 to perform RPS+0. Then, go to Step S360 to determine whether or not the next temperature falls within the normal cooling interval.

As described, if it is determined in Step S360 that the next temperature falls within the normal cooling interval, then go to Step S370 to have the control module 5 to perform RPS+o, and further go back to Step S360. The detection temperature detected by the temperature sensor 3 at the next detection period is the new next temperature, and, as such, the new next temperature is further to be judged if or not it falls within the normal cooling interval? Until when the new next temperature falls out of the normal cooling interval, then the method would go back to Step S140.

In Step S340, if it is determined that the current temperature falls out of the normal cooling interval, or that the previous temperature falls out of the rapid cooling interval, then go to Step S380 to determine whether or not the current temperature falls within the rapid cooling interval? If the current temperature falls within the rapid cooling interval, then go to Step S390 to determine whether or not a decrease of the next temperature is greater than or equal to 3° C. If positive, then go to Step S400 to have the control module 5 to perform RPS+0, and then go back to Step S140.

However, if it is determined in Step S390 that the decrease of the next temperature is not greater than or equal to 3° C., then go to Step S410 to have the control module 5 to perform RPS+3, and then go back to Step S140.

In Step S380, if it is determined that the current temperature falls out of the rapid cooling interval, then go to Step S420. Namely, while the current temperature falls within the allowable temperature interval, then the control module 5 performs RPS+0, and the entire flow of the method ends.

By providing the aforesaid Step S110 to Step S420, the detection temperature in the storage space 13 of the main refrigerator body 1 can be kept within the allowable temperature interval, such that frequent startup and shutdown at the compressor can be avoided, temperature fluctuation inside the storage space 13 can be reduced effectively, and thus foods stored in the storage space 13 can be kept fresh.

In addition, it shall be particularly explained that, in this embodiment, the compressor in the refrigeration space 12 is furnished by setting with the maximum rotational speed (for example, 80 RPS) and the minimum rotational speed (for example, 20 RPS). Thus, in Step S210, even that RPS-n has been performed by the control module 5, the speed of the compressor can't be lower than the minimum rotational speed. However, if the compressor keeps running at the minimum rotational speed for a period of time, the target temperature can still rise gradually to reach the allowable temperature interval. Then, the loop formed by Step S210 and Step S200 can be escaped. Similarly, even that RPS+o has been performed by the control module 5 in Step S330, the speed of the compressor can't be higher than the maximum rotational speed. Also, if the compressor keeps running at the maximum rotational speed for a period of time, the target temperature can still drop gradually to escape the normal cooling interval.

While the present invention has been particularly shown and described with reference to a preferred embodiment, it will be understood by those skilled in the art that various changes in form and detail may be without departing from the spirit and scope of the present invention.

What is claimed is:

1. A refrigerator storage temperature control method, applied to a refrigerator, the refrigerator including a main refrigerator body, a compressor, a temperature sensor, a processing module and a control module, the main refrigerator body having a setting interface, a refrigeration space and a storage space connected spatially with the refrigeration space, the temperature sensor configured for detecting a temperature of the storage space, the compressor disposed in the refrigeration space and configured for introducing a refrigerant gas in the refrigeration space to the storage space, the control module configured for controlling a revolution per second (RPS) of the compressor according to the temperature detected by the temperature sensor, the refrigerator storage temperature control method comprising the steps of:

(A) utilizing the setting interface to receive a target temperature (Ts) from a user;

(B) utilizing the processing module to define a regulated temperature upper limit value (T1=Ts−a° C., a>0) and an allowable temperature upper limit value (T2=Ts+a° C.), according to the Ts;

(C) utilizing the processing module to define an adjustment interval, an allowable temperature interval and a convergent cooling interval, according to the T1 and the T2, the adjustment interval being less than or equal to the T1, the allowable temperature interval being greater than the T1 and less than or equal to the T2, the convergent cooling interval being greater than the T2;

(D) utilizing the temperature sensor to detect and update periodically a detection temperature with a detection period, the detection temperature detected in a previous detection period being defined as a previous temperature, the detection temperature detected in an instant detection period being defined as a current temperature, the temperature sensor further transmitting the previous temperature and the current temperature to the processing module;

(E) utilizing the processing module to generate a judgment result by determining within which period the current temperature falls, and further to transmit the judgment result to the control module; when the judgment result tells that the current temperature falls within the adjustment interval, the control module performing RPS-m, the m being a positive integer greater than 0 and less than 20; then, when the detection temperature detected and updated by the temperature sensor with the detection period still falls within the adjustment interval, the control module performing RPS-n till that the detection temperature falls out of the adjustment interval, the n being a positive integer greater than 0 and less than 20; when the judgment result tells that the current temperature falls within the allowable temperature interval, the control module performing RPS+0; when the judgment result tells that the current temperature falls within the convergent cooling interval, and the previous temperature falls within the allowable temperature interval, the control module performing RPS+o, the o being a positive integer greater than 0 and less than 20; then, when the detection temperature detected and updated by the temperature sensor with the detection period still falls within the convergent cooling interval, the control module performing RPS+p till that the detection temperature falls out of the convergent cooling interval, the p being a positive integer greater than 0 and less than 20; and (F) when the judgment result of the Step (E) tells that the current temperature falls out of the allowable temperature interval, repeating the Steps (D) to (E), till that the judgment result of the Step (E) determines that the current temperature falls within the allowable temperature interval.

2. The refrigerator storage temperature control method of claim 1, wherein the Step (B) further includes a step of utilizing the processing module to define a shutdown temperature upper limit value (T3=Ts−b ° C., b>a) according to the Ts, the Step (C) further includes a step of utilizing the processing module to define a shutdown interval according to the T3, the shutdown interval is less than or equal to the T3, the adjustment interval is greater than the T3, and the Step (E) further includes a step of having the control module to perform RPS=0 when the judgment result tells that the current temperature falls within the shutdown interval.

3. The refrigerator storage temperature control method of claim 2, wherein b=2a.

4. The refrigerator storage temperature control method of claim 2, wherein the Step (B) further includes a step of utilizing the processing module to define a convergent cooling temperature upper limit value (T4=Ts+c° C., c>b) according to the Ts, the Step (C) further includes a step of utilizing the processing module to define a normal cooling interval according to the T4, the normal cooling interval is greater than the T4, the convergent cooling interval is further less than or equal to the T4, the Step (E) further includes a step of having the control module to perform RPS+o upon when the judgment result tells that the current temperature falls within the convergent cooling interval, and the previous temperature falls within the allowable temperature interval, and to perform RPS+p till that the detection temperature falls out of the convergent cooling interval upon when the detection temperature detected and updated by the temperature sensor with the detection period still falls within the convergent cooling interval, the Step (E) further includes a step of having the control module to perform RPS+0 upon when the judgment result tells that the current temperature falls within the convergent cooling interval, and the previous temperature falls within the normal temperature interval, and to perform RPS+p till that the detection temperature falls out of the convergent cooling interval upon when the detection temperature detected and updated by the temperature sensor with the detection period still falls within the convergent cooling interval, and the Step (E) further includes a step of having the control module to perform RPS+o upon when the judgment result tells that the current temperature falls within the normal cooling interval, and the previous temperature falls within the convergent cooling interval, and to perform RPS+o till that the detection temperature falls out of the normal cooling interval upon when the detection temperature detected and updated by the temperature sensor with the detection period still falls within the normal cooling interval.

5. The refrigerator storage temperature control method of claim 4, wherein c=4a.

6. The refrigerator storage temperature control method of claim 4, wherein the Step (B) further includes a step of utilizing the processing module to define a normal cooling temperature upper limit value (T5=Ts+d° C., d>c) according to the Ts, the Step (C) further includes a step of utilizing the processing module to define a rapid cooling interval according to the T5, the rapid cooling interval is greater than the T5, the normal cooling interval is further less than or equal to the T5, the Step (E) further includes a step of having the control module to perform RPS+0 upon when the judgment result tells that the current temperature falls within the rapid cooling interval, and a temperature decrease detected by the temperature sensor with the detection period is greater than or equal to 3° C., and to perform RPS+n till that the detection temperature falls out of the rapid cooling interval upon when the temperature decrease is less than 3° C., and the Step (E) further includes a step of having the control module to perform RPS+0 upon when the judgment result tells that the current temperature falls within the normal cooling interval, and the previous temperature falls within the rapid cooling interval, and to perform RPS+o till that the detection temperature falls out of the normal cooling interval upon when the detection temperature detected and updated by the temperature sensor with the detection period still falls within the normal cooling interval.

7. The refrigerator storage temperature control method of claim 6, wherein d=10a.

8. The refrigerator storage temperature control method of claim 1, wherein m>n, n>o and o>p.

* * * * *